US008275905B2

(12) United States Patent
Xiao et al.

(10) Patent No.: US 8,275,905 B2
(45) Date of Patent: Sep. 25, 2012

(54) SYSTEM AND METHOD FOR STORE-AND-FORWARD FOR HIGHLY AVAILABLE MESSAGE PRODUCTION

(75) Inventors: Dongbo Xiao, Edison, NJ (US); Kawaljit Singh, Princeton, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 324 days.

(21) Appl. No.: 12/104,613

(22) Filed: Apr. 17, 2008

(65) Prior Publication Data
US 2008/0263221 A1 Oct. 23, 2008

Related U.S. Application Data

(60) Provisional application No. 60/912,397, filed on Apr. 17, 2007.

(51) Int. Cl.
*G06F 15/16* (2006.01)
(52) U.S. Cl. ........ 709/237; 709/238; 709/201; 709/204; 709/217; 709/228; 709/245
(58) Field of Classification Search .................. 709/238, 709/201, 204, 217, 228, 245
See application file for complete search history.

(56) References Cited

U.S. PATENT DOCUMENTS

| 5,274,696 A * | 12/1993 | Perelman .................. 379/88.19 |
| 6,144,668 A * | 11/2000 | Bass et al. ..................... 370/401 |
| 6,961,137 B1 * | 11/2005 | Tamura ........................ 358/1.15 |
| 2004/0205770 A1 * | 10/2004 | Zhang et al. .................... 719/313 |
| 2004/0215709 A1 * | 10/2004 | Basani et al. ................. 709/201 |
| 2005/0165861 A1 * | 7/2005 | Christie et al. ................ 707/201 |
| 2006/0123088 A1 * | 6/2006 | Simmons et al. ............ 709/206 |
| 2007/0204275 A1 * | 8/2007 | Alshab et al. ................. 719/313 |
| 2008/0034382 A1 * | 2/2008 | Brown et al. ................. 719/330 |
| 2009/0239544 A1 * | 9/2009 | Myllynen et al. ............. 455/445 |
| 2009/0319624 A1 * | 12/2009 | Buschi et al. ................. 709/206 |
| 2010/0070331 A1 * | 3/2010 | Koegler et al. .................... 705/9 |

* cited by examiner

*Primary Examiner* — Lan-Dai T Truong
(74) *Attorney, Agent, or Firm* — Fliesler Meyer LLP

(57) ABSTRACT

The present invention enables a store-and-forward service that provides higher availability for application residing or connecting to a server to reliably deliver messages and allows an application to send messages to a destination on another server even when the destination is not available at the moment the messages are sent because of network problems or system failures. The messages will be stored durably and temporarily on a local server, and then be efficiently forwarded to the destination once it becomes available.

19 Claims, 2 Drawing Sheets

SYSTEM AND METHOD FOR STORE-AND-FORWARD FOR HIGHLY AVAILABLE MESSAGE PRODUCTION

CLAIM OF PRIORITY

This application claims priority from the following application, which is hereby incorporated by reference in its entirety:

U.S. Provisional Application No. 60/912,397, entitled SYSTEM AND METHOD FOR STORE-AND-FORWARD FOR HIGHLY AVAILABLE MESSAGE PRODUCTION, by Dongbo Xiao et al., filed on Apr. 17, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of message delivery and processing.

BACKGROUND

A messaging service, for a non-limiting example, an implementation of the Java® Messaging Service (JMS) standard, supports the formal communication known as messaging between computers (servers) within a cluster in a network (a standalone server is considered as a cluster with one server). Here, messaging is the creation, storage, exchange, and management of messages between producers who send/publish the messages to a destination and consumers who receive, subscribe, and browse the messages from the destination. Here, a message can be but are not limited to, text, image, voice, telex, fax, e-mail, paging, and other suitable electronic data describing events, requests, and replies over a communication network.

DETAILED DESCRIPTION

Figure 1:
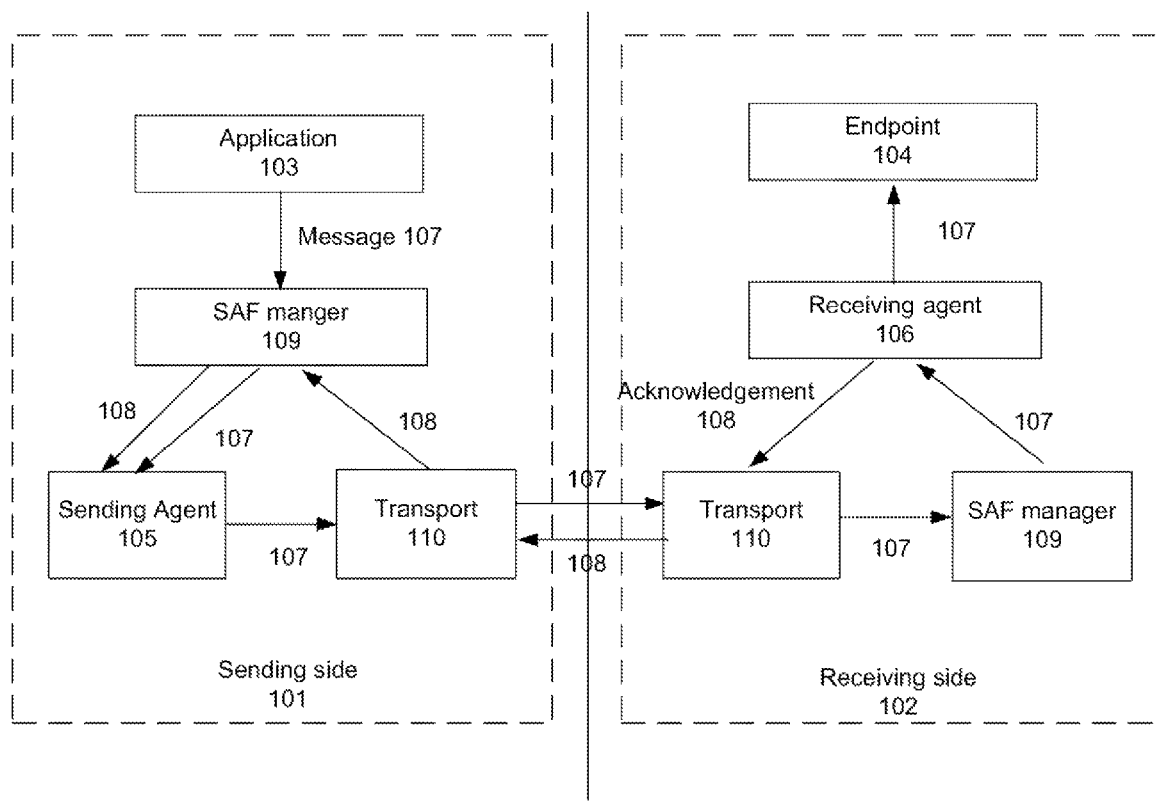
FIG. 1 is an exemplary system illustrating the relationship between all parts that participate in storing and forwarding a message in one embodiment of the present invention.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention enable a new store-and-forward (SAF) service that provides higher availability for application residing or connecting to a server (server instance) to reliably deliver messages and allows an application to send messages to a destination on another server even when the destination is not available at the moment the messages are sent because of network problems or system failures. The messages will be stored durably and temporarily on a local server, and then be efficiently forwarded to the destination once it becomes available. The store-and-forward feature improves the availability of services from a customer's perspective, and it can happen between servers within the same server cluster, between two clusters, across different Web domains, or between two standalone server instances.

A destination is a representation of a queue or topic in a remote server instance or cluster that the local server instance or cluster can send messages to. When a producer sends messages to a destination, these messages are stored on the destination for future delivery. A destination is considered to be unavailable when it resides in a different cluster than where a client (application) connects and is not reachable because of network problems or system failures. For many messaging services, an application is not able to send messages to a given destination if it is unavailable. Consequently, applications have to periodically poll the availability of the destinations. This limits the availability of the messaging service, especially when the destination and the applications are in different clusters.

An endpoint is a reference point in a messaging workflow where messages will eventually reach or temporarily passing by on their way to a final endpoint.

The store-and-forward service maintains the order of messages for each sending (source) and receiving pair. The source of a message is the application that sends the message to the SAF service. The application can be but is not limited to, a producer, a front-end for a subsystem, a Web Service client for a Web services subsystem, or a sending agent. If the subsystem supports the concept of conversation or sequence of messages, the source may be the conversation itself. The receiving endpoint can be a JMS destination, a Web Services component, or a receiving agent.

In some embodiments, the remote endpoint can be a distributed destination. Messages to a remote distributed destination are stored and forwarded in the same way as messages that are forwarded to remote standalone destinations. The SAF sending agent routes the messages to a member of the distributed destination the same way as we do currently.

FIG. 1 is an exemplary system illustrating the relationship between all parts that participate in storing and forwarding a message in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, there are two sides involved in the process of storing and forwarding a message: the sending side 101 and the receiving side 102. In situations where both the sending side and the receiving side are server instances, the sending side will be local to the application 103, and the receiving side may be remote to the application, either geographically or functionally, but local to the receiving destination/endpoint 104. In these cases, the SAF service will have an agent on each side, called the sending agent 105 and the receiving agent 106, respectively. SAF agents are responsible for store-and-forwarding messages between these local sending and remote receiving endpoints. A SAF agent can be configured to have only sending capabilities, receiving capabilities, or both.

Sending agent—a sending-capable agent has to exist on one of the servers in the local cluster where the application client connects. The sending agent handles storing the messages, retries, and sending messages 107 to the remote side using a reliable messaging protocol. If message persistence is required (for persistent messages), a sending agent stores messages to a persistent storage, forwards messages to the receiving side, and re-transmits messages when acknowledgements do not come back in time. A sending agent can be used for JMS messages and Web Services Reliable Messaging (WSRM).

Receiving agent—a receiving capable agent must also exist on one of the servers in the cluster where the final destination is configured. Receiving agents detect and eliminate duplicate messages sent by a sending agent, and delivers messages to the final destination. They keep the history records and eliminate duplicate messages, maintain the ordering of the messages, deliver the messages to their ultimate endpoints, and send acknowledgement 108 back to the sending agent. A receiving agent can be used for WSRM.

From a SAF application point of view, there is one single access point to the store-and-forward service: the store-and-forward manager 109, which exists on every server instance on both sending and receiving sides. An application, like JMS, submits a store-and-forward request to the SAF manager once it determines that store-and-forward is required. Along with the request, the application also specifies which protocol to use by indicating the type of the transport 110 (which carries the protocol). The SAF manager is responsible for processing the requests and routing the message to the right agents in a cluster. The manager will guarantee that the SAF load is balanced among agent instances, with the restriction that all messages participating in the same conversation are routed to the same sending/receiving agent.

Figure 2:
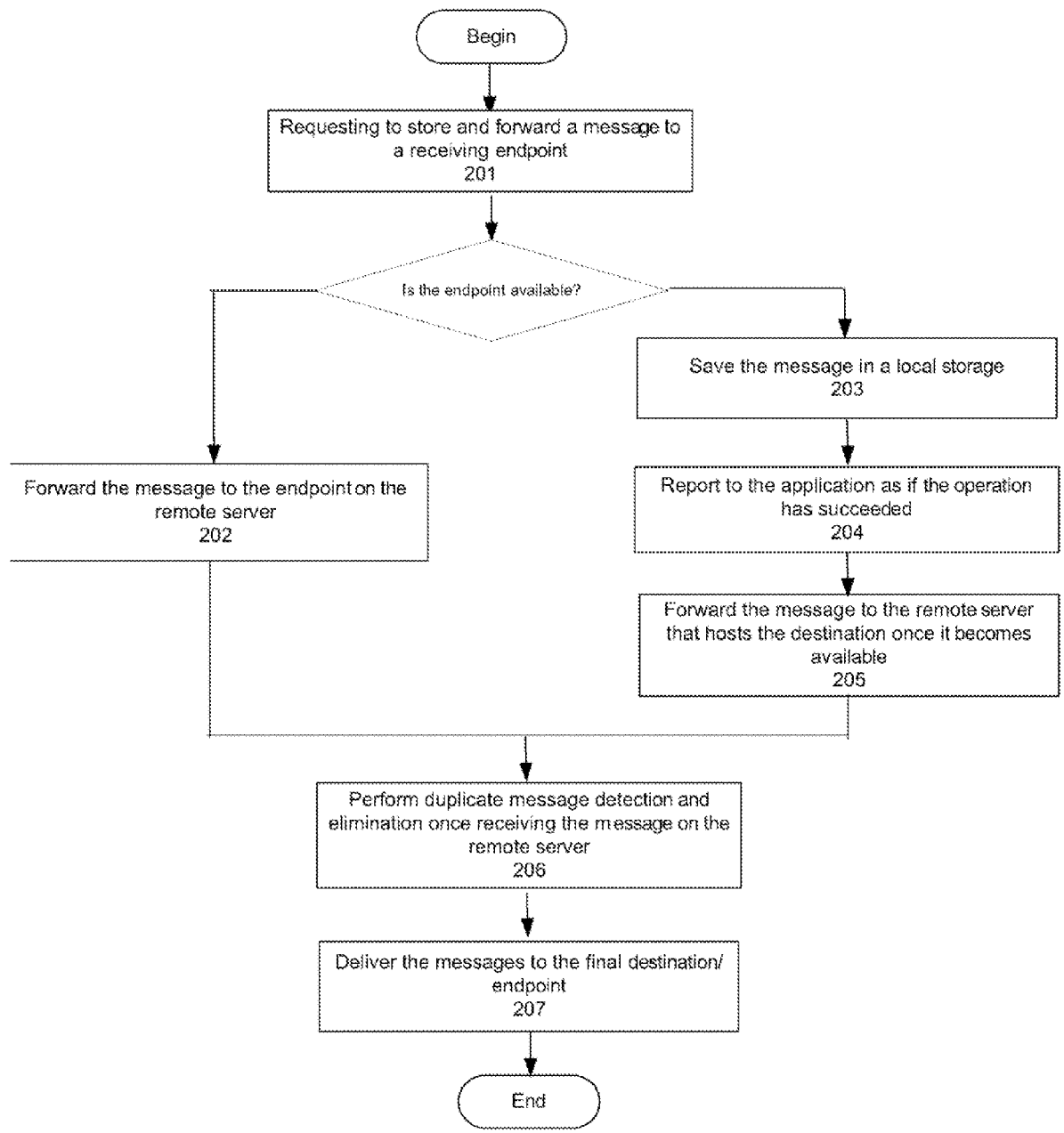
FIG. 2 is a flow chart illustrating an exemplary process for messaging service based on storing and forwarding in accordance with one embodiment of the invention.

FIG. 2 is a flow chart illustrating an exemplary process for messaging service based on storing and forwarding in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, an application submits a request to a SAF manager on the sending side to store-and-forward a message to a receiving endpoint at step 201. The SAF manager then hand the messages to a sending agent that is configured within the local cluster. If the endpoint is available, the messages will be forwarded to the endpoint on the remote server at step 202. If the given destination/endpoint is not available at the time the message is sent, the sending agent takes the message and saves it in a local storage at step 203, and report to the application as if the operation has succeeded at step 204. The sending agent will forward the message to the remote server that hosts the destination at step 205 once it becomes available. Once receiving the message, the receiving agent on the remote server or remote cluster will perform duplicate message detection and elimination at step 206 before it delivers the messages to the final destination at step 207.

In some embodiments, a sending agent communicates with a receiving agent using a reliable messaging protocol, which can be the Web Service standard protocol such as WSRM.

In some embodiments, the receiving agent saves the history record for detecting and eliminating message duplicates. At runtime it uses an in-memory history record and it must also be backed by a persistent storage in order to survive system crashes. The operation of updating the history record (in memory and in persistent storage) and delivering the message have to be atomic (either both happen or neither happens). One important requirement to the storage on the receiving side is how to update the history record and the message in an atomic store operation. If the history record and the message are separate store entries, the history record update to the store has to be done in an atomic operation with writing the message to the store.

In some embodiments, the store-and-forward service is only server-to-server, meaning that an application has to connect to a server instance before it can send messages to a destination that is hosted on a different server.

In some embodiments, the store-and-forward service only supports one-way operation for sending a message to a remote server, and it cannot be used for receiving a message from a remote server. In other words, an application can only receive directly from a remote endpoint when it is available. For applications that require request/response, the SAF manager is responsible for sending the response back to the local server, possibly using the SAF service on the return path as well for the response (return value).

In some embodiments, if an application specifies a conversation, it (or the subsystem that uses SAF service) may give each message in a plurality of messages during the conversation a unique sequence number that is increased by one. The sending agent will make its best effort to send the message to the remote side in the same order, and the receiving side will guarantee that the messages are delivered in that order to the endpoint. If the SAF application does not assign a sequence number to the messages in a conversation, the SAF service will assign each message in the conversation a unique internal sequence number. For applications that do not specify a conversation, the sending agent will guarantee that the messages for each source-endpoint pair are delivered in the order that they arrive at the source. Internally, the sending agent creates a conversation for each source-endpoint pair and assigns a sequence number to each message that is from the same source and goes to the same endpoint. For a new conversation, the sending side always chooses the local agent, if there is one; otherwise, it will choose one in the same cluster using a round robin algorithm. Similarly, the receiving side will always choose an agent local to the endpoint, if there is one; otherwise, it will choose one in the same cluster using round-robin. For subsequent messages in a conversation, both the sending side and the receiving side will have affinity to the agent that has been chosen for the conversation.

In some embodiments, the store-and-forward feature supports three different levels of Quality of Service (QoS):

Exactly-once—The highest QoS guarantees that a message is sent to the remote endpoint once and only once. With this QoS, the messages will survive server crashes and network down time, while guaranteeing one occurrence of each message at the endpoint.

At-least-once—The medium level QoS guarantees that a message is sent to the remote endpoint, but with the possibility of duplicates. With this QoS, multiple copies of a message might show up on the remote endpoint due to any network failures or server crashes while the sending agent forwards the message to the remote endpoint.

At-most-once—The lowest QoS does not guarantee that a message is sent to the endpoint, but it guarantees that each message is only sent to the remote endpoint once, if any. With this QoS, messages may get lost due to any network failures or server crashes; however, there will never be duplicate messages in the endpoint.

The subsystem that uses the SAF service can specify the desired QoS in their configuration. For a non-limiting example, in JMS SAF, persistent JMS messages are always forwarded with Exactly-Once QOS provided by the SAF service. For non-persistent messages, all three different QOS levels can be defined in the configuration of an imported destination.

In some embodiments, each message service must configure a store to support all of the levels of QoS. If the sending agent does not have a store configured and there is no default store on the server, the SAF will not guarantee the "exactly-once" and "at-least-once" QoS in the event of system failures on the sending side. If the receiving agent does not have a store and there is no default store for the server, the SAF service will not guarantee the "exactly-once" and "at-most-once" QoS in the event of system failures on the receiving side.

In some embodiments, the store-and-forward service can also specify a delivery mode for each message as follows:

Persistent messages will be saved in a persistent storage on the sending side until they are successfully forwarded to and acknowledged by the receiving side. The receiving side must also store the history record persistently for eliminating duplicates if "Exactly-once" or "At-most-once" QoS is required.

Non-persistent messages will be kept in memory until the receiving side acknowledges them, while non-persistent messages can be lost if the sending side crashes.

In some embodiments, the pending messages may use up the sending side server's memory and even take the server down if the remote side is not available for a long time. A system administrator can protect the server from running out of memory by setting up quotas for each agent. Once the quota is about to be exceeded, the agent will reject any new requests. The administrator can also configure SAF to page out messages or history records to a persistent store before the agent reaches the quotas. Paging will be triggered by certain conditions specified as thresholds in the store-and-forward service configuration. The persistent store for messages or history records is also used for paging purposes.

In some embodiments, if an application message is in a transaction, saving the message in the persistent storage must be part of the user transaction to preserve exactly-once semantics. In particular, the message will be removed from the persistent storage as part of the transaction rollback if the application decides to rollback the transaction. However, forwarding is not part of the application transaction as the sending agent will not forward a transactional message until the transaction commits. Within a transaction, message ordering is preserved based on when the messages are sent.

In some embodiments, when a server instance reboots, the messages that were not sent before the server previously went down will be recovered from the store. The sending agent has to send those messages to the remote side if they have not expired. Similarly, on the receiving side, the history records must be recovered during reboot. How an application correlates the result or response of a request that is sent after a reboot is the responsibility of the subsystem that uses the SAF service.

In some embodiments, the sending agent needs to connect to the receiving side in order to forward messages over, yet there are times that the connection may not be available. When an attempt at establishing a new connection fails, the sending agent must retry until it succeeds. Similarly, if the desired QoS is exactly-once or at-least-once, the sending agent has to keep sending a message until it receives an acknowledgement for that message.

In some embodiments, a system administrator can specify values of parameters to control the frequency of attempts and the interval between two subsequent attempts. By default, a fixed interval is set between two successive attempts. If the interval is not fixed, an exponential back-off algorithm will be used to adjust the retry intervals. The delays will be exponentially increased, starting from a specified based value, and will be multiplied by a specified multiplier each time. The amount of delay will not be increased any more once a specified maximum value is reached. These parameters can be configured for each sending-capable SAF agent and the same set of parameters controls both the reestablishment of a connection to the receiving side and the retransmission of a message over an existing connection.

In some embodiments, system administrators should be able to specify the options of the error handling policy. The error handling policy defines the action taken when a sending agent fails to forward a message to the remote endpoint before the message expires. For a non-limiting example, in JMS SAF, an application can choose from three options for error handling: discard the message, discard the message with a log message in a pre-defined log file, and redirect the message to a pre-defined endpoint.

In some embodiments, system administrators should be able to look at the SAF store on the sending side to view the content of a message if they have access privileges. The administrator may not be allowed to remove individual messages from the store, move some messages to another location, or modify the content of a message. However, the administrator should be able to destroy a conversation, and put all messages in the conversation through the error handling process configured by the SAF application.

In some embodiments, the administrator can configure the duration that a message needs to be delivered by a SAF agent reliably since the reliability of store-and-forward is time based. When the time-to-live expires, the sending agent will remove the message from its storage and stop the effort of retransmitting the message to the remote side. It is up to the application to decide what to do with the messages that fail to be delivered when its time-to-live expires. The SAF agent notifies an endpoint instance about the failure, and the endpoint will handle it accordingly.

In some embodiments, the administrator may pause a SAF agent and resume it at a later time.

Pause/resume incoming messages: if an administrator pauses a sending agent on incoming messages, the sending agent will not accept any new requests from SAF applications, but it will continue to forward backlogged messages to the remote side. A new SAF request will fail and get an exception.

Pause/resume forwarding messages: if an administrator pauses a sending agent on forwarding messages, the sending agent will stop forwarding messages, but it will continue to accept new requests from the SAF applications and acknowledgements/faults from the receiving agents.

Pause/Resume receiving messages: if an administrator pauses a receiving agent on receiving messages, the receiving agent will stop accepting any messages that come from any sending agent, however, it will continue to process those messages that it has received before the "pause" operation is issued.

In some embodiments, the administrator may destroy a conversation, which will put all messages in the conversation through the error handling process configured by the SAF application, and clean up all resources associated with that conversation.

In some embodiments, the administrator may purge all messages in a SAF store for a particular remote endpoint, which will put all pending messages through the error handling process configured by the SAF application.

In some embodiments, all the failed messages will be logged in its server log if logging is enabled for the sending agent. This is an alternative for applications that do not have their own failure handling or their failure handling cannot complete (for a non-limiting example, in JMS SAF, if the error destination is down for a long time, the "redirect" policy will not be completed).

In some embodiments, each standalone server must have a SAF service configured; otherwise, clients that are connected to the servers will not be able to take advantage of the SAF feature and any SAF calls will fail with an exception. The storage used by the SAF service must exist locally, either explicitly configured or implicitly configured for the server by default. In a clustered environment, the administrator may configure the SAF service on selected servers in the cluster. However, the administrator has to configure SAF agent on at least one server in the cluster; otherwise, SAF calls will fail with an exception.

In some embodiments, the SAF service may optionally take advantage of the store configured for an endpoint and rely on the endpoint to handle the history record and duplicate elimination tasks. One non-limiting example of such an endpoint is a WebLogic JMS destination. Normally a JMS destination may have a store to use for persistent messages. There will be significant performance gains if we use the same store for the history records too, without having to configure a store on the receiving agent.

In some embodiments, each SAF agent can be configured as a server migratable service, so that the service can be migrated from one server to another in a cluster. The SAF service participates in server's lifecycle process, and it also has to implement a migratable interface to support manual and automatic migration from one server instance to another. The SAF service may not be available for some endpoints in the middle of migration. When this happens, the SAF application will get an exception.

In some embodiments, the components or acting agents of the SAF service can communicate with each other using the Web Service Reliable Messaging Protocol as the protocol and HTTP as the transport to successfully deliver messages with a required QoS.

In some embodiments, the SAF feature needs a single authority in a cluster for storing and managing the naming information in order to route the messages of the same conversation to the same sending agent and receiving agent path in a clustered environment. For a non-limiting example, the proposed cluster message naming service in the WebLogic Server product will serve this purpose.

In some embodiments, the SAF sending agent has to have permission to access the remote server, cluster or domain. A SAF application passes a security credential to the SAF sending agent in an instance. The sending agent must establish a security context with the remote side, which is done at the protocol layer. When SAF occurs between two server domains, the sending agent and the receiving agent have to have permission to talk to each other. To avoid forcing the administrator to establish a trusted relationship between the two domains, each agent has to act as a subject that has permission to access the other side. In other words, the username/password fields passed to the SAF agent by the subsystem that uses SAF have to have permission to access the remote domain.

In some embodiments, application authorization checking is done at the SAF application layer. It is the protocol's responsibility to decide whether the security information will be forwarded to the remote side with the message. If any security error occurs at the receiving side, the receiving agent must send a Fault message back to the sending agent using the Reliable Messaging Protocol. The sending agent will re-transmit the message until its time-to-live expires.

In some embodiments, there are multiple instances of sending agents and receiving agents, load-balancing policy is round-robin plus conversation affinity. This solution provides high available SAF service, that is, the SAF service will still be available when one of the agents is temporarily not available. The only exception is that subsequent messages for any existing conversation that is handled by the failed server previously will fail until the server comes up. The only disadvantage is that the SAF clients, SAF transport, or SAF endpoint can be remote to the agents, which involves communication calls over the wire between them.

In some embodiments, the centralized SAF service is to have a single instance of the sending agent and receiving agent. It will work well with distributed destinations and clustered web service with less complicated code. However it is a single point failure, although it can be designed as a migratable service. It also shares the main disadvantage with the distributed solution above: remote access to the SAF service.

In some embodiments, localized solution is to have one sending agent collocated with and dedicated to each server that can hosts a SAF client (a JMS front end or web service application) and one receiving agent collocated and dedicated to each server that hosts a SAF endpoint (a JMS destination or a web service component). All communications between the different parts that involved in SAF process are local. Because the agent is always collocated with the SAF client or the SAF Endpoint, this solution provides higher availability. The receiving side is simpler because we don't have to have daemons any more. However this solution needs more configuration work when the remote endpoint is a JMS distributed destination and when a reliable web service is cluster-wide available. This also will result in a $O(N^2)$ connections on the receiving side. The only time it will not result in this $N^2$ connections is when all the endpoints are co-located with the receiving agent.

In some embodiments, the internal data structure used for SAF on the sending side is more likely to have tremendous number of messages pending to be forwarded to the remote side because of temporary unavailability of a remote endpoint. It may not be sufficient to just page out the message bodies, like JMS server does for JMS queues and topics. Message headers may also need to be paged out to disk to prevent them from using up the server's memory.

In some embodiments, the SAF may redirect the message to an alternative endpoint once it fails to deliver a message, if there is one configured for the SAF agent or supplied by the subsystem that uses SAF service. Normally the alternative endpoint (also known as an error destination) must be on the same server instance that hosts the SAF agent.

In some embodiments, a JMS producer can be associated with a message unit-of-order within a cluster, which enables a stand-alone message producer, or a group of producers acting as one, to group messages into a single unit with respect to the processing order.

In some embodiments, store-and-forward can compress messages when they are forwarded between different clusters. A message compression threshold can be set programmatically using a JMS API extension to a message producer interface, or administratively by either specifying a default compression threshold value on a connection factory or on a JMS remote SAF context. When an uncompressed message that exceeds the remote SAF context's compression threshold value is about to be forwarded across the SAF boundary, it is compressed. The message stays compressed until it is received by the remote endpoint. If the message has already been compressed when it crosses the SAF boundary because the compression is turned on the connection factory, the message will stay compressed across SAF boundary no matter if the SAF compression is triggered or not.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "application" is used in the embodiments of the systems and methods described above, it will be evident that such concept can be interchangeably used with equivalent concepts such as, module, class, method, component, object, and other suitable concepts. While the concept "agent" is used in the embodiments of the systems and methods described above, it will be evident that such concept can be interchangeably used with equivalent concepts such as, class, method, interface, component, object, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide store-and-forward for a messaging service, comprising:
a sending agent running on one or more processors, adapted to receive a request from a source to store-and-forward a message of a plurality of messages to a destination in a plurality of destinations, wherein the plurality of messages appear at the source in an order, and wherein, when the destination is not available, the sending agent is operable to perform:
saving said message in a local storage;
reporting to the source;
forwarding said message to the destination once the destination becomes available; and
guaranteeing that, the plurality of messages are delivered to each destination in the order that the plurality of messages appear at the source for each source-destination pair;
a receiving agent operable to perform:
detecting and eliminating duplicate messages once the receiving agent receives each said message;
forwarding the message to the destination; and
providing acknowledgement back to the sending agent.

2. The system according to claim 1, further comprising:
a store-and-forward manager operable to:
process the request from the source; and
route each said message to the sending agent.

3. The system according to claim 1, wherein:
the system supports multiple levels of Quality of Service (QoS) that allows each said message to be sent to the destination
exactly once,
at least once, or
at most once.

4. The system according to claim 1, wherein:
the source is an application that is one of a producer, a front-end for a subsystem, and a web service client for a web service subsystem.

5. The system according to claim 1, wherein:
the messaging service can be Java® Messaging Service (JMS).

6. The system according to claim 1, wherein:
each said message is one of a text, an image, a voice, a telex, a fax, an e-mail, a paging, and an electronic data describing events, requests, and replies over a communication network.

7. The system according to claim 1, wherein:
each said message is compressed before it is forwarded.

8. The system according to claim 1, wherein:
the source and the sending agent reside on a local server or cluster.

9. The system according to claim 8, wherein:
the receiving agent and the destination reside on a server or cluster remote to the local server or cluster either geographically or functionally.

10. The system according to claim 9, wherein:
the destination is a queue or a topic on the remote server or cluster.

11. The system according to claim 9, wherein:
the sending agent is further operable to access the remote server or cluster with security permission.

12. The system according to claim 1, wherein:
the sending agent is further operable to save a persistent message in a persistent storage or a non-persistent message in memory.

13. The system according to claim 1, wherein:
the receiving agent is further operable to store history of duplicate message detection and elimination in-memory and/or in a persistent storage.

14. The system according to claim 1, wherein:
the sending and receiving agent communicate with each other using Web Service Reliable Messaging (WSRM) protocol.

15. The system according to claim 1, wherein:
the sending and/or receiving agent can each has a plurality of parameters configured and specified for store-and-forward, wherein the plurality of parameters control the frequency and/or time of attempts to deliver each said message to the destination.

16. The system according to claim 1, wherein:
at least one said message is in a transaction message that is saved in a persistent storage, wherein the transaction message is sent to the destination when the transaction commits, and wherein the transaction message is removed from the persistent storage as part of rolling back the transaction.

17. The system according to claim 1, wherein:
the sending agent is operable to assign each message in a conversation a unique internal sequence number.

18. A method to provide store-and-forward for a messaging service, comprising:
receiving a request from a source to store-and-forward a message of a plurality of messages to a destination in a plurality of destinations, wherein the plurality of messages appear at the source in an order;
saving said message in a local storage when the destination is not available;
reporting to the source;
forwarding said message to the destination once the destination becomes available;
guaranteeing that, the plurality of messages are delivered to each destination in the order that the plurality of messages appear at the source for each source-destination pair; and
detecting and eliminating duplicate messages once receiving each said message before forwarding the message to the destination.

19. A non-transitory machine readable storage medium having instructions stored thereon that when executed cause a system to:
receive a request from a source to store-and-forward a message of a plurality of messages to a destination in a plurality of destinations, wherein the plurality of messages appear at the source in an order;
save said message in a local storage when the destination is not available;
report to the source;
forward said message to the destination once the destination becomes available;
guaranteeing that, the plurality of messages are delivered to each destination in the order that the plurality of messages appear at the source for each source-destination pair; and
detect and eliminate duplicate messages once receiving each said message before forwarding the message to the destination.

* * * * *

UNITED STATES PATENT AND TRADEMARK OFFICE
CERTIFICATE OF CORRECTION

PATENT NO.        : 8,275,905 B2                                     Page 1 of 1
APPLICATION NO.   : 12/104613
DATED             : September 25, 2012
INVENTOR(S)       : Xiao et al.

It is certified that error appears in the above-identified patent and that said Letters Patent is hereby corrected as shown below:

On sheet 1 of 2, in figure 1, Reference Numeral 109, line 1, delete "manger" and insert -- manager --, therefor.

In column 5, line 10-11, delete "SAFservice." and insert -- SAF service. --, therefor.

Signed and Sealed this
First Day of January, 2013

David J. Kappos
*Director of the United States Patent and Trademark Office*